US009170780B2

(12) United States Patent
Gieselmann et al.

(10) Patent No.: US 9,170,780 B2
(45) Date of Patent: Oct. 27, 2015

(54) PROCESSING CHANGED APPLICATION METADATA BASED ON RELEVANCE

(75) Inventors: Thomas Gieselmann, Hockenheim (DE); Markus Viol, Walldorf (DE); Carsten Brandt, Mannheim (DE); Lars Erbe, Stutensee (DE); Stefan Haffner, Hockenheim (DE); Alexander Rauh, Weinheim (DE); Franz Müller, Stutensee (DE)

(73) Assignee: SAP SE, Walldorf (DE)

( * ) Notice: Subject to any disclaimer, the term of this patent is extended or adjusted under 35 U.S.C. 154(b) by 865 days.

(21) Appl. No.: 13/326,560

(22) Filed: Dec. 15, 2011

(65) Prior Publication Data
US 2013/0159971 A1 Jun. 20, 2013

(51) Int. Cl.
G06F 9/44 (2006.01)
G06F 9/45 (2006.01)

(52) U.S. Cl.
CPC ........................................ *G06F 8/30* (2013.01)

(58) Field of Classification Search
None
See application file for complete search history.

(56) References Cited

U.S. PATENT DOCUMENTS

| | | | | |
|---|---|---|---|---|
| 8,370,802 B2* | 2/2013 | Pacifici et al. | ................. | 717/120 |
| 8,640,096 B2* | 1/2014 | Arcese et al. | ................. | 717/121 |
| 8,713,526 B2* | 4/2014 | Jones et al. | .................... | 717/121 |
| 8,782,604 B2* | 7/2014 | Konduri et al. | ............... | 717/122 |
| 2007/0143379 A1* | 6/2007 | i Dalfo et al. | ................. | 707/205 |
| 2008/0201299 A1* | 8/2008 | Lehikoinen et al. | .............. | 707/3 |
| 2009/0313503 A1* | 12/2009 | Atluri et al. | ...................... | 714/19 |
| 2010/0082556 A1* | 4/2010 | Srinivasan et al. | ............ | 707/693 |
| 2012/0167178 A1* | 6/2012 | Rauh et al. | ......................... | 726/4 |
| 2013/0019235 A1* | 1/2013 | Tamm | ........................... | 717/170 |
| 2013/0031528 A1* | 1/2013 | Khader et al. | ................. | 717/106 |
| 2013/0055201 A1* | 2/2013 | No et al. | ........................ | 717/113 |
| 2013/0061209 A1* | 3/2013 | Lam | ............................... | 717/123 |
| 2013/0159971 A1* | 6/2013 | Gieselmann et al. | ......... | 717/120 |
| 2014/0310686 A1* | 10/2014 | Srinivasan et al. | ............ | 717/120 |

OTHER PUBLICATIONS

G.T. Heineman and W.T. Councill, Definition of a software component and its elements, in: Component-Based Software Engineering: Putting the Pieces together, eds. G.T. Heineman and W.T. Councill (Addison-Wesley, Boston, 2001).*
GNU Make, Published at http://www.gnu.org/software/make/manual/make.html Date: Jun. 5, 2009.*
Makefile—How does make track timestamps, published at http://stackoverflow.com/questions/7507355/how-does-make-track-timestamps, Sep. 2011.*
GNU Makefile (published at http://www.gnu.org/software/make/manual/make.html)—Jun. 5, 2009.*

* cited by examiner

*Primary Examiner* — Don Wong
*Assistant Examiner* — Hossain Morshed
(74) *Attorney, Agent, or Firm* — Buckley, Maschoff & Talwalkar LLC

(57) ABSTRACT

A system includes execution of a software application based on metadata defining a first plurality of software components, reception of second metadata defining the first plurality of software components, determination, based on the second metadata, of a second plurality of the first plurality of software components for which the second metadata is different from the first metadata, and for which the second metadata is associated with elements of the software application, and generation of the elements of the software application based on the second metadata of the second plurality of software components.

9 Claims, 5 Drawing Sheets

| ShortName | Timestamp |
|---|---|
| comp001 | 010302011123323 |
| comp007 | 010302011123445 |
|  |  |
|  |  |

*FIG. 4A*

| ShortName | Timestamp |
|---|---|
| comp001 | 010302011123323 |
| comp007 | 010302011123445 |
| comp013 | 01102011093423 |
|  |  |

*FIG. 4B*

| ShortName | Timestamp |
|---|---|
| comp001 | 010302011123323 |
| comp007 | 01100201093554 |
| comp013 | 01102011093423 |
|  |  |

*FIG. 4C*

PROCESSING CHANGED APPLICATION METADATA BASED ON RELEVANCE

FIELD

Some embodiments relate to metadata-driven application platforms. More specifically, some embodiments relate to systems to effect imported metadata changes within a backend service layer.

BACKGROUND

A backend service layer may implement metadata models to support different business solutions. Metadata models may include generic models of a business object, a floorplan (i.e., a user interface layout), user interface text, a process component, and a message type, among others. A business object, for example, is a software model representing real-world items used during the transaction of business. An instance of a business object metadata model may comprise a SalesOrder object model or an Organization object model. Instances of these object models, in turn, represent specific data (e.g., SalesOrder 4711, ACME corporation).

An instance of a business object metadata model (e.g., a SalesOrder object model or, more generically, a business object object model) may specify business logic and/or data having any suitable structure. The structure may be determined based on the requirements of a business scenario in which the instance is to be deployed. A business application for a particular business scenario may require many business object object models, where the structure of each has been determined based on the requirements of the particular business scenario.

A customer deploying a business application may desire changes to the business objects included in the business application. For example, a customer may require a field (e.g., "SerialNumber") which does not exist within the "Product" business object of a business application. A developer may therefore modify the metadata of the business object in the backend service layer to provide the additional field. A business application might also provide pre-defined user interfaces to interact with the business objects. A developer may similarly modify metadata of these user interfaces to add entities of a user interface data model and to bind these user interface data entities to business object entities.

The modified metadata must be imported by a backend service layer in order to take effect. Some systems provide a report which lists software components whose metadata has been modified. These software components may comprise business objects, user interface entities, etc., and the metadata modifications may affect certain elements of a software application which depend on the software components.

For example, according to role-based access management systems, a change pointer table lists any workcenters, workcenter views, floorplans, report usages and external user interface applications having changed metadata. Next, all workcenter views related to the changed UI entities are determined. Authorization policies are then regenerated for each determined workcenter view. However, some of the metadata modifications might not have any affect on authorization policies, so much of this policy regeneration might unnecessarily hamper runtime performance.

BRIEF DESCRIPTION OF THE DRAWINGS

FIGS. 4A through 4C are tabular representations of a data structure according to some embodiments.

DETAILED DESCRIPTION

Figure 1:
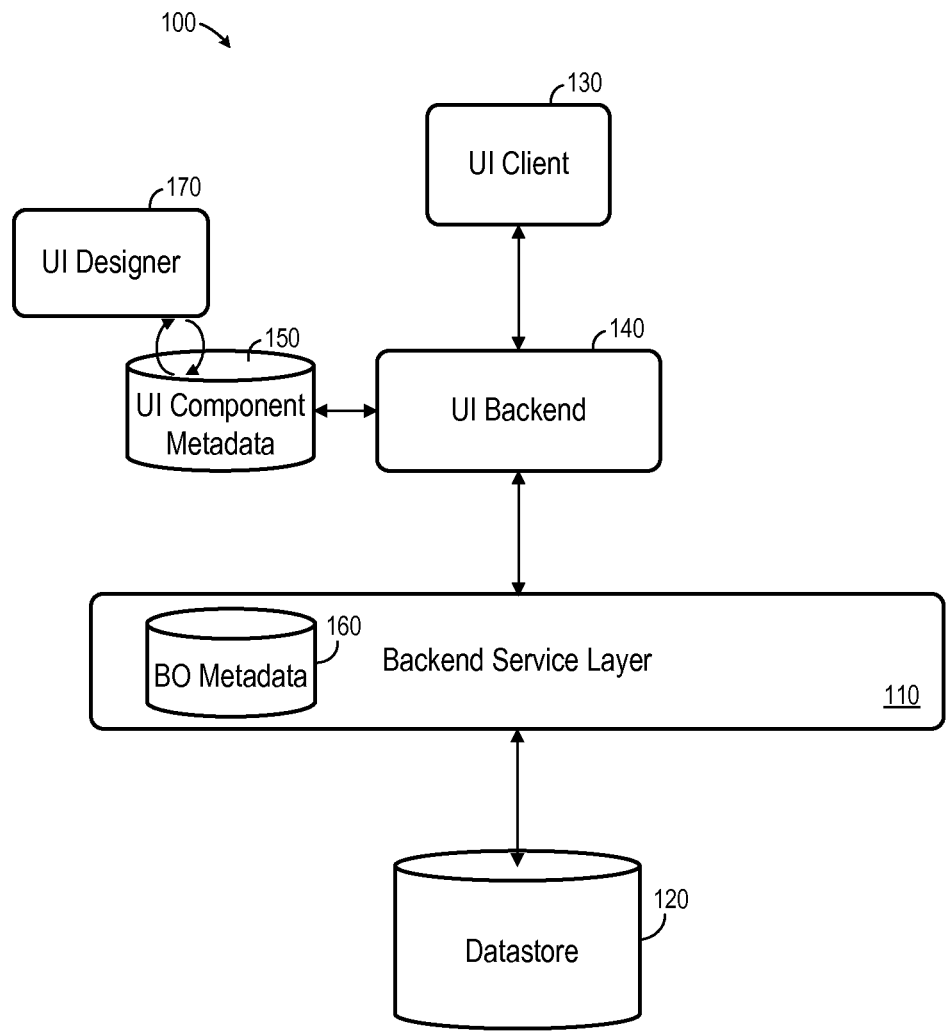
FIG. 1 is a block diagram of a system according to some embodiments.

FIG. 1 is a detailed block diagram of system 100 according to some embodiments. System 100 includes backend service layer 110, datastore 120, user interface (UI) client 130, UI backend 140, UI component metadata 150, business object metadata 160 and UI designer 170. FIG. 1 represents a logical architecture for describing some embodiments, and actual implementations may include more or different components arranged in any manner. Some embodiments may also reflect architectures different from that shown in FIG. 1.

Backend service layer 110 may comprise an enterprise services infrastructure and/or any implementation for providing services according to a service-oriented architecture paradigm. Backend service layer 110 may provide services to one or more service consumers. The services are provided by executing applications based on business object metadata 160. According to the illustrated embodiment, the services may include retrieving, creating, modifying and/or deleting the data of business object instances stored in datastore 120. Datastore 120 may comprise any one or more systems to store business data. Such systems include, but are not limited to, relational database systems, Online Analytical Processing (OLAP) database systems, data warehouses, application servers, and flat files.

To provide economies of scale, datastore 120 may include data of more than one customer (i.e., "tenant"). Backend service layer 110 includes mechanisms to ensure that a tenant accesses only the data that the tenant is authorized to access. Moreover, the data of datastore 120 may be indexed and/or selectively replicated in an index to allow fast retrieval thereof.

The data stored in datastore 120 may be received from disparate hardware and software systems, some of which are not interoperational with one another. The systems may comprise a back-end data environment employed in a business or industrial context. The data may be pushed to datastore 120 and/or provided in response to queries received therefrom.

UI designer 170 may be operated by a developer to design user interfaces by creating and modifying UI component metadata 150. UI component metadata 150 may conform to a UI component model 150 which is suited to implementation of a user interface. The developer adds UI elements to screen layout patterns and binds the elements to entities of BO metadata 160. This binding facilitates the transmission of data to and from backend service layer 110.

UI client 130 comprises an application to render user interfaces defined by UI component metadata 150. UI client 130 also receives user input (e.g., modification of data within a displayed field, selection of an item from a drop-down menu, selection of a checkbox, etc.) and, in response, transmits a corresponding UI request to UI backend 140. UI client 130 may execute, for example, within a Web browser.

According to some embodiments, UI client 130 is located at a client or user site, while the other elements of system 100 are housed at a provider site and may provide services to other UI clients located at the same or another user site. The other elements need not always be accessible to UI client 130. That is, UI client 130 may operate in an "offline" mode.

UI backend 140 provides communication between UI client 130 and backend service layer 110. Generally, UI backend 140 receives a UI request which conforms to UI component metadata 150 from UI client 130, communicates with backend service layer 110 to fulfill the request, and provides a response which conforms to UI component metadata 150 to UI client 130. According to some embodiments, backend service layer 110 and UI backend 140 are components of a same physical computing device. Operation of UI backend 140 according to some embodiments will be described below.

Figure 2:
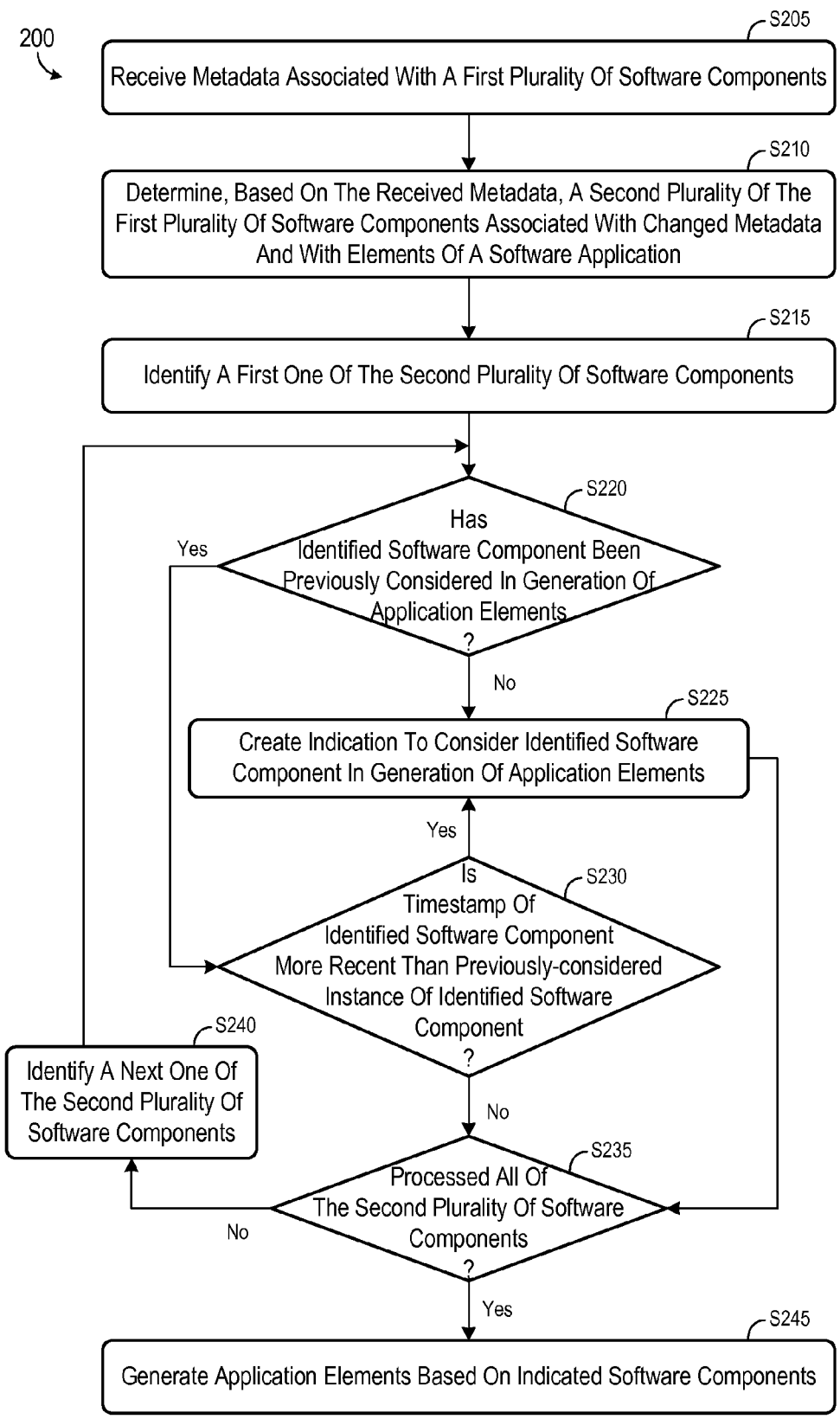
FIG. 2 is a flow diagram of a process according to some embodiments.

FIG. 2 comprises a flow diagram of process 200 according to some embodiments. In some embodiments, one or more computing devices of an enterprise service provider execute program code to perform process 200.

All processes mentioned herein may be embodied in processor-executable program code stored on one or more of non-transitory computer-readable media, such as a fixed disk, a floppy disk, a CD-ROM, a DVD-ROM, a Flash drive, and a magnetic tape. In some embodiments, hard-wired circuitry may be used in place of, or in combination with, program code for implementation of processes according to some embodiments. Embodiments are therefore not limited to any specific combination of hardware and software.

Process 200 may be performed at runtime to deploy metadata changes into an application platform such as that shown in FIG. 1. In this regard, prior to process 200, the application platform was executing a software application based on metadata defining a first plurality of software components (e.g., UI component metadata 150 and/or BO metadata 160). Then, at S205, new metadata associated with the first plurality of software components is received. The received metadata may include the entirety of UI component metadata 150 and BO metadata 160, or any subset thereof. Some or all of the received metadata defining particular software components may be identical to the prior metadata defining the particular software components, and based on which the application was executing.

Figure 3:
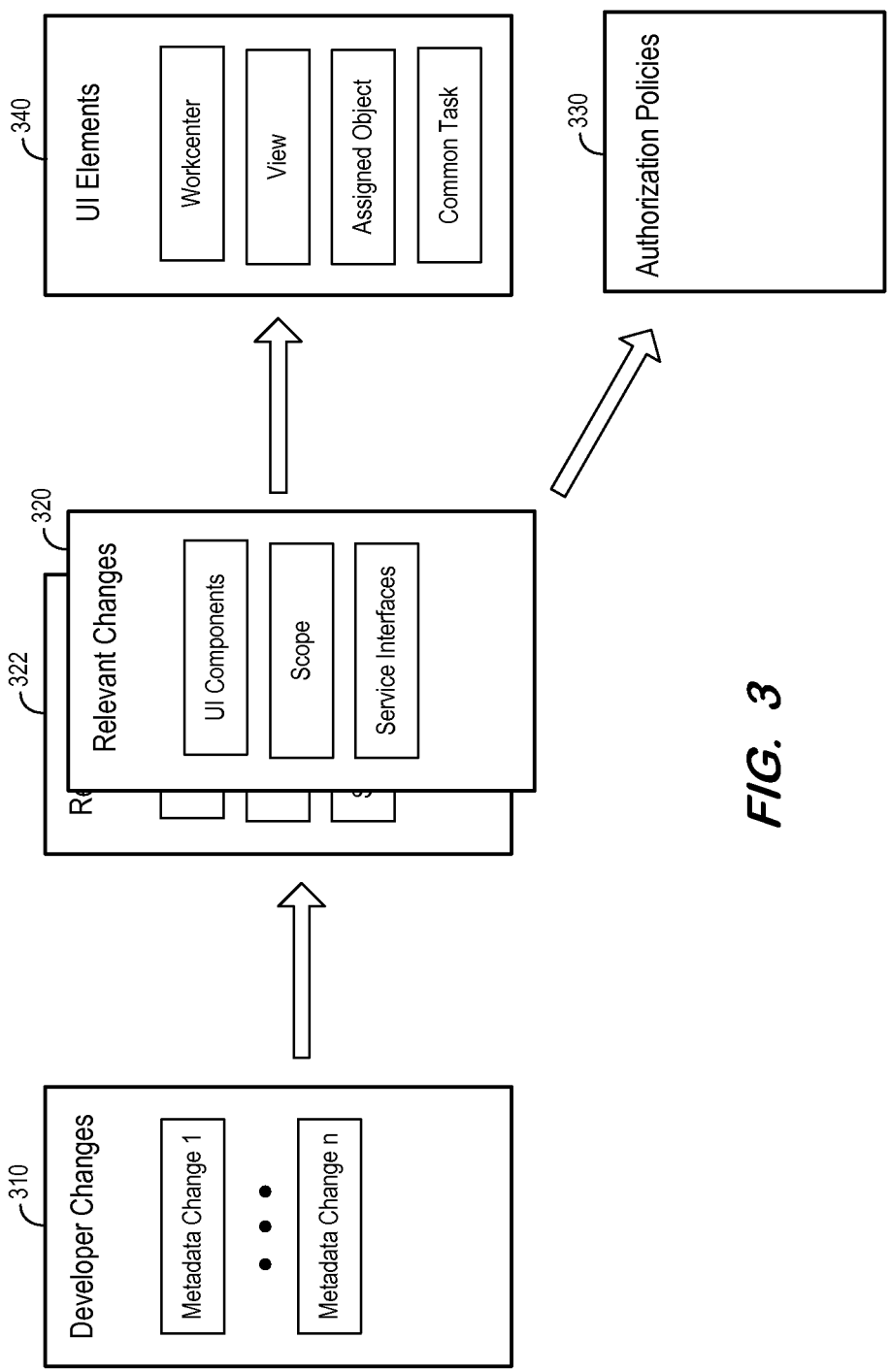
FIG. 3 is a block diagram illustrating an example according to some embodiments.

FIG. 3 is a block diagram to illustrate execution of process 200 according to some embodiments. As shown, developer changes 310 include a plurality of metadata changes which are received at S205. Developer changes 310 may comprise, for example, changes to metadata defining a UI component such as a workcenter.

Next, at S210, a second plurality (i.e., a subset) of the first plurality of software components is determined based on the metadata received at S205. Each of the second plurality of software components is associated with metadata received at S205 which is different from the prior metadata associated therewith. That is, S210 comprises a determination of those software components whose metadata has been changed.

S210 also comprises a determination that each of the determined second plurality of software components is associated with elements of the software application. For example, the metadata defining each of the determined second plurality of software components may be associated with authorization policies of the software application (e.g., Role-Based Access Management (RBAM) policies). Accordingly, because this metadata was changed, the authorization policies must be regenerated in view of the changed metadata.

Relevant changes 320 of FIG. 3 represent the second plurality of software components determined at S210 according to some embodiments. As shown, relevant changes includes not only UI components as discussed above, but also scope and service interface components. Embodiments are not limited to the types of software components mentioned herein.

According to some embodiments, the determination at S210 is performed by checking an attribute defined by a developer at design time. For example, prior to process 200, and only if authorization-relevant metadata defining a UI component is changed, a developer fills an attribute (e.g., RBAMChangeTimeStamp) of the metadata with a timestamp indicating the time at which the metadata was changed. Therefore, identification of the software components whose metadata is both changed and relevant to authorization policies merely requires comparing the timestamps of the received metadata with the timestamps of the current metadata defining the software components.

One of the second plurality of software components is identified at S215 for further processing. Next, at S220, it is determined whether the identified software component has been previously considered in the generation of the application elements (e.g., authorization policies) to which its metadata was deemed relevant at S210. If not, an indication to consider the identified software component during generation of the application elements is created at S225.

FIG. 4A illustrates table 400 according to some embodiments. Table 400 lists the software components which were previously considered during generation of the application elements. If it is determined at S220 that the software component identified at S215 is not listed in table 400, flow proceeds to S225 to create an entry including an identifier of the component and its associated timestamp. For example, it is assumed that a component comp013 is identified at S215. Since component comp013 is not listed in table 400 of FIG. 4A, a corresponding entry is created as shown in FIG. 4B.

Flow then proceeds to S235 to determine whether all of the second plurality of software components have been processed. If not, a next one of the second plurality of software components is identified at S240 and flow returns to S220 for the determination described above.

Continuing the present example, it is now assumed that the identified component is comp007. Since component comp007 is listed in table 400, flow proceeds from S220 to S230 to determine whether the timestamp of the received metadata defining component comp007 is more recent than the timestamp of the previously-considered metadata defining component comp007. If so, the entry of table 400 is updated at S225 to include the timestamp of the metadata of component comp007 received at S205, as shown in FIG. 4C.

If it is determined at S230 that the timestamp of the received metadata is not more recent than the timestamp of the previously-considered metadata, flow proceeds to S235 without modifying table 400. Flow cycles through S220-S240 as described above until it is determined at S235 that all of the second plurality of software components have been processed. Then, at S245, application elements are generated based on the newly-received metadata of the indicated software components (e.g., the components listed in table 400). According to some embodiments, table 400 is passed to a sequencer for regeneration of the application elements using known processes.

As described above, the application elements may comprise authorization policies. FIG. 3 depicts the creation of authorization policies 330 based on indicated ones of components 320 according to some embodiments. FIG. 3 also depicts the generation of application elements 340 based on relevant changes 322.

In this regard, process 200 may execute with respect to more than one type of application elements. That is, relevant changes 320 may include components for which changed metadata was received and for which the changes are relevant to authorization policies 330, while relevant changes 322 may include components for which changed metadata was received and for which the changes are relevant to UI elements 340. Therefore, S215 through S245 may also be executed with respect to relevant changes 322 to generate UI elements 340 therefrom.

Figure 5:
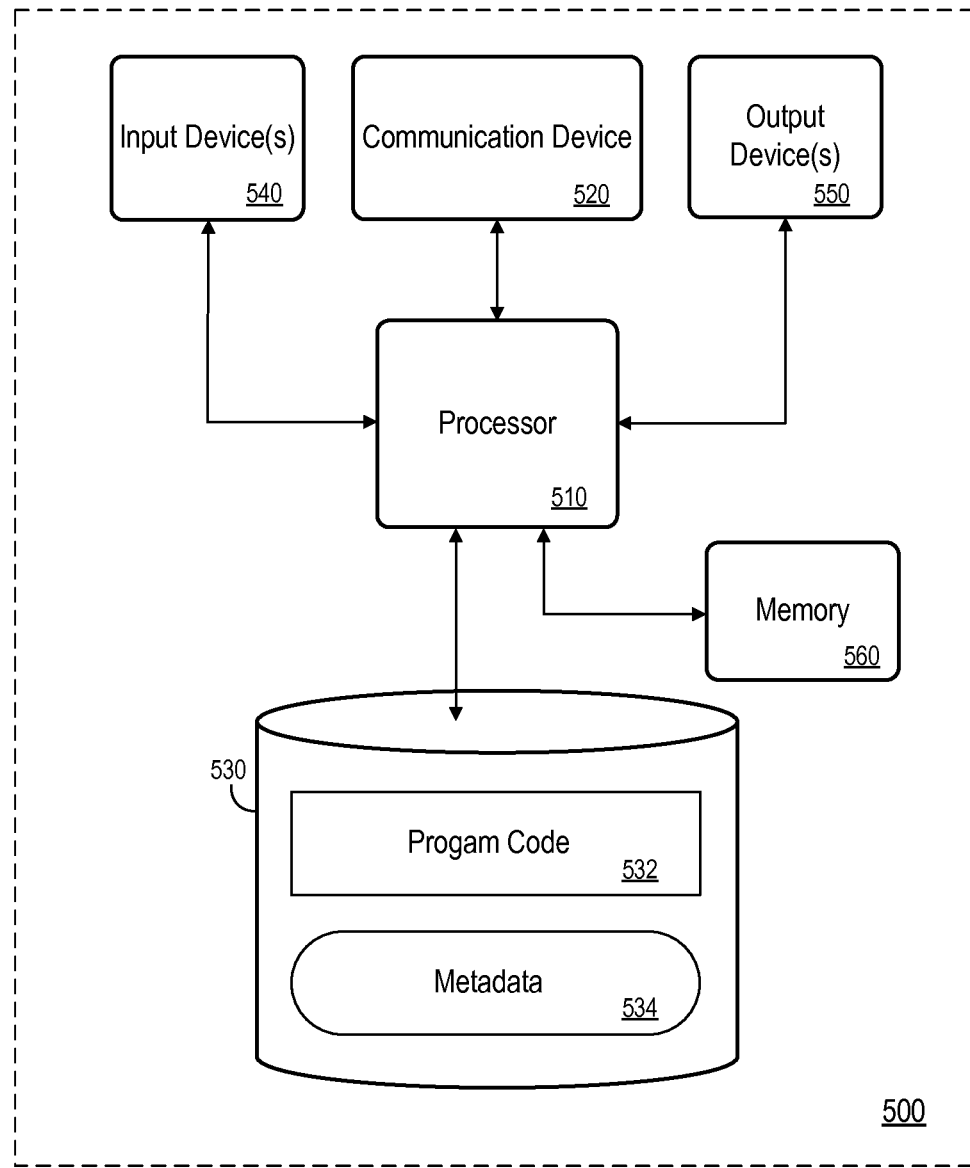
FIG. 5 is a block diagram of a computing device according to some embodiments.

FIG. 5 is a block diagram of apparatus 500 according to some embodiments. Apparatus 500 may comprise a general-purpose computing apparatus and may execute program code to perform any of the functions described herein. Apparatus 500 may comprise an implementation of one or more elements of system 100. Apparatus 500 may include other unshown elements according to some embodiments.

Apparatus 500 includes processor 510 operatively coupled to communication device 520, data storage device 530, one or more input devices 540, one or more output devices 550 and memory 560. Communication device 520 may facilitate communication with external devices, such as an external design tool. Input device(s) 540 may comprise, for example, a keyboard, a keypad, a mouse or other pointing device, a microphone, knob or a switch, an infra-red (IR) port, a docking station, and/or a touch screen. Input device(s) 540 may be used, for example, to enter information into apparatus 500. Output device(s) 550 may comprise, for example, a display (e.g., a display screen) a speaker, and/or a printer.

Data storage device 530 may comprise any appropriate persistent storage device, including combinations of magnetic storage devices (e.g., magnetic tape, hard disk drives and flash memory), optical storage devices, Read Only Memory (ROM) devices, etc., while memory 560 may comprise Random Access Memory (RAM).

Program code 532 of data storage device 530 may be executable by processor 510 to provide functions described herein, including but not limited to process 200. Embodiments are not limited to execution of these functions by a single apparatus. Metadata 534 may include metadata 150 and/or 160 as described herein. Data storage device 530 may also store data and other program code for providing additional functionality and/or which are necessary for operation thereof, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each system described herein may be implemented by any number of devices in communication via any number of other public and/or private networks. Two or more of such computing devices may be located remote from one another and may communicate with one another via any known manner of network(s) and/or a dedicated connection. Each device may comprise any number of hardware and/or software elements suitable to provide the functions described herein as well as any other functions. For example, any computing device used in an implementation of system 100 may include a processor to execute program code such that the computing device operates as described herein.

Elements described herein as communicating with one another are directly or indirectly capable of communicating over any number of different systems for transferring data, including but not limited to shared memory communication, a local area network, a wide area network, a telephone network, a cellular network, a fiber-optic network, a satellite network, an infrared network, a radio frequency network, and any other type of network that may be used to transmit information between devices. Moreover, communication between systems may proceed over any one or more transmission protocols that are or become known, such as Asynchronous Transfer Mode (ATM), Internet Protocol (IP), Hypertext Transfer Protocol (HTTP) and Wireless Application Protocol (WAP).

The embodiments described herein are solely for the purpose of illustration. Those in the art will recognize other embodiments may be practiced with modifications and alterations limited only by the claims.

What is claimed is:

1. A method implemented by a computing system in response to execution of program code by a processor of the computing system, comprising:

executing a software application based on metadata defining data models of a first plurality of software components;

receiving second metadata defining the data models of the first plurality of software components;

determining, based on the second metadata, a second plurality of the first plurality of software components for which the second metadata defining the data models is different from the first metadata defining the data models;

determining, from the second plurality of software components, a third plurality of software components for which the second metadata defining the data models of the third plurality of software components is associated with authorization policies of the software application, where the second plurality of software components comprises one or more other software components for which the second metadata defining the data models of the one or more other software components is not associated with the authorization policies of the software application; and generating the authorization policies of the software application based on the second metadata defining the data models of the third plurality of software components, and not based on the one or more other software components.

2. A method according to claim 1, wherein determining the third plurality of software components comprises:

determining that one of the second plurality of software components is associated with the authorization policies of the software application; and determining that a timestamp of the second metadata associated with the one of the second plurality of software components is later than a timestamp of the first metadata associated with the one of the second plurality of software components.

3. A method according to claim 1, further comprising:

determining, based on the second metadata, a fourth plurality of the first plurality of software components for which the second metadata defining the data models of the fourth plurality of software components is different from the first metadata defining the data models of the fourth plurality of software components;

determining, from the fourth plurality of software components, a fifth plurality of software components for which the second metadata defining the data models of the fourth plurality of software components is associated with user interface elements of the software application, where the fourth plurality of software components comprises a second one or more other software components for which the second metadata defining the data models of the second one or more other software components is not associated with the user interface elements of the software application; and generating the user interface elements of the software application based on the second metadata defining the data models of the fifth plurality of software components, and not based on the second one or more other software components.

4. A non-transitory medium storing processor-executable program code, the program code executable by a device to:
execute a software application based on metadata defining data models of a first plurality of software components;
receive second metadata defining the data models of the first plurality of software components;
determine, based on the second metadata, a second plurality of the first plurality of software components for which the second metadata defining the data models is different from the first metadata defining the data models;
determine, from the second plurality of software components, a third plurality of software components for which the second metadata defining the data models of the third plurality of software components is associated with authorization policies of the software application, where the second plurality of software components comprises one or more other software components for which the second metadata defining the data models of the one or more other software components is not associated with the authorization policies of the software application; and
generate the authorization policies of the software application based on the second metadata defining the data models of the third plurality of software components, and not based on the one or more other software components.

5. A medium according to claim 4, wherein the program code executable by the device to determine the third plurality of software components comprises program code executable by the device to:
determine that one of the second plurality of software components is associated with the authorization policies of the software application; and
determine that a timestamp of the second metadata associated with the one of the second plurality of software components is later than a timestamp of the first metadata associated with the one of the second plurality of software components.

6. A medium according to claim 4, further comprising program code executable by the device to:
determine, based on the second metadata, a fourth plurality of the first plurality of software components for which the second metadata defining the data models of the fourth plurality of software components is different from the first metadata defining the data models of the fourth plurality of software components;
determine, from the fourth plurality of software components, a fifth plurality of software components for which the second metadata defining the data models of the fourth plurality of software components is associated with user interface elements of the software application, where the fourth plurality of software components comprises a second one or more other software components for which the second metadata defining the data models of the second one or more other software components is not associated with the user interface elements of the software application; and generate the user interface elements of the software application based on the second metadata defining the data models of the fifth plurality of software components, and not based on the second one or more other software components.

7. A computing system comprising:
a memory system storing processor-executable program code; and
a processor to execute the processor-executable program code in order to cause the computing device to:
execute a software application based on metadata defining data models of a first plurality of software components;
receive second metadata defining the data models of the first plurality of software components;
determine, based on the second metadata, a second plurality of the first plurality of software components for which the second metadata defining the data models is different from the first metadata defining the data models;
determine, from the second plurality of software components, a third plurality of software components for which the second metadata defining the data models of the third plurality of software components is associated with authorization policies of the software application, where the second plurality of software components comprises one or more other software components for which the second metadata defining the data models of the one or more other software components is not associated with the authorization policies of the software application; and
generate the authorization policies of the software application based on the second metadata defining the data models of the third plurality of software components, and not based on the one or more other software components.

8. A system according to claim 7, wherein determination of the third plurality of software components comprises:
determination that one of the second plurality of software components is associated with the authorization policies of the software application; and
determination that a timestamp of the second metadata associated with the one of the second plurality of software components is later than a timestamp of the first metadata associated with the one of the second plurality of software components.

9. A system according to claim 7, the processor further to execute the processor-executable program code in order to cause the computing device to:
determine, based on the second metadata, a fourth plurality of the first plurality of software components for which the second metadata defining the data models is different from the first metadata;
determine, from the fourth plurality of software components, a fifth plurality of software components for which the second metadata defining the data models of the fourth plurality of software components is associated with user interface elements of the software application, where the fourth plurality of software components comprises a second one or more other software components for which the second metadata defining the data models of the second one or more other software components is not associated with the user interface elements of the software application; and
generate the user interface elements of the software application based on the second metadata defining the data models of the fifth plurality of software components, and not based on the second one or more other software components.

* * * * *